United States Patent
Bansal et al.

(10) Patent No.: US 10,331,532 B2
(45) Date of Patent: Jun. 25, 2019

(54) PERIODIC NON-INTRUSIVE DIAGNOSIS OF LOCKSTEP SYSTEMS

(71) Applicant: QUALCOMM Incorporated, San Diego, CA (US)

(72) Inventors: Kapil Bansal, Bangalore (IN); Kailash Digari, Bangalore (IN); Rahul Gulati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/410,271

(22) Filed: Jan. 19, 2017

(65) Prior Publication Data

US 2018/0203778 A1 Jul. 19, 2018

(51) Int. Cl.
*G06F 11/27* (2006.01)
*G06F 11/273* (2006.01)
*G06F 11/22* (2006.01)
*G06F 11/16* (2006.01)

(52) U.S. Cl.
CPC ........ *G06F 11/273* (2013.01); *G06F 11/1645* (2013.01); *G06F 11/2215* (2013.01); *G06F 11/2242* (2013.01); *G06F 2201/805* (2013.01)

(58) Field of Classification Search
CPC ............................... G06F 11/27; G06F 11/275
USPC .......................................................... 714/57
See application file for complete search history.

(56) References Cited

U.S. PATENT DOCUMENTS

| | | | |
|---|---|---|---|
| 6,233,702 B1 * | 5/2001 | Horst | G01R 31/31727 711/E12.026 |
| 6,496,940 B1 | 12/2002 | Horst et al. | |
| 6,862,693 B2 | 3/2005 | Chaudhry et al. | |
| 7,392,426 B2 | 6/2008 | Wolfe et al. | |
| 2002/0152420 A1 * | 10/2002 | Chaudhry | G06F 11/1641 714/11 |
| 2005/0278567 A1 * | 12/2005 | Wolfe | G06F 11/184 714/11 |
| 2009/0217092 A1 * | 8/2009 | Weiberle | G06F 11/165 714/24 |
| 2009/0276665 A1 * | 11/2009 | Mayer | G06F 11/3636 714/38.13 |

(Continued)

FOREIGN PATENT DOCUMENTS

EP 2113842 A1 11/2009

OTHER PUBLICATIONS

International Search Report and Written Opinion—PCT/US2017/065685—ISA/EPO—dated Apr. 6, 2018.

(Continued)

*Primary Examiner* — Kamini B Patel
(74) *Attorney, Agent, or Firm* — Patterson & Sheridan, LLP (57) ABSTRACT

Aspects disclosed herein relate to periodic non-intrusive diagnosis of lockstep systems. An exemplary method includes comparing execution of a program on a first processing system of the plurality of processing systems and execution of the program on a second processing system of the plurality of processing systems using a first comparator circuit, comparing the execution of the program on the first processing system and the execution of the program on the second processing system using a second comparator circuit, and running a diagnosis program on the second comparator circuit while the comparing using the first comparator circuit is ongoing.

34 Claims, 6 Drawing Sheets

(56) References Cited

U.S. PATENT DOCUMENTS

| | | | |
|---|---|---|---|
| 2012/0079209 A1* | 3/2012 | Zhou | G06F 12/08 |
| | | | 711/141 |
| 2013/0238945 A1* | 9/2013 | Vilela | G06F 11/1654 |
| | | | 714/49 |
| 2015/0339201 A1* | 11/2015 | Kanekawa | G06F 11/165 |
| | | | 714/6.11 |
| 2016/0055047 A1* | 2/2016 | Okamoto | G06F 11/079 |
| | | | 714/57 |
| 2016/0092320 A1* | 3/2016 | Baca | G06F 11/1641 |
| | | | 714/49 |
| 2016/0117210 A1 | 4/2016 | Reichenbach et al. | |
| 2017/0074930 A1* | 3/2017 | Nayyar | G06F 17/5068 |
| 2017/0357557 A1* | 12/2017 | Jain | G06F 11/1608 |

OTHER PUBLICATIONS

Sander 0., et al., "The Promised Future of Multi-Core Processors in Avionics Systems", Ceas Aeronautical Journal, Springer Vienna, Vienna, vol. 8, No. 1, Dec. 2, 2016 (Dec. 2, 2016), pp. 143-155, XP036159828, ISSN: 1869-5582, Doi: 10.1 007/S13272-016-0228-X [retrieved on Dec. 2, 2016].

* cited by examiner

PERIODIC NON-INTRUSIVE DIAGNOSIS OF LOCKSTEP SYSTEMS

BACKGROUND

Aspects disclosed herein relate to the field of computer processors. More specifically, aspects disclosed herein relate to periodic non-intrusive diagnosis of lockstep systems.

Automated systems for vehicle control are gaining in prevalence. Just for automotive driver assist systems (ADAS), some predictions call for a 24% compound annual growth rate over the next five years. Functional safety is a key requirement for these systems, which may include ADAS), unmanned aerial vehicle (UAV) systems, aeronautics systems, and defense systems. For example, in a car, an emergency braking system and an adaptive cruise control cannot afford to see failures, as a failure may result in unbearable consequences, such as a car accident. Similarly, aeronautic control systems also cannot afford failures.

ISO Standard 26262 requires compliant systems to be designed and configured to avoid unreasonable risks due to hazards caused by malfunctioning behavior of electrical and/or electronic systems. Faults in systems can be random failures due to soft-errors, hardware aging, or circuit failure. In order to be resilient to failures, one approach that has been followed is to have more than one compute engine running in lockstep for redundancy and every activity (e.g., outputs of the compute engines) is compared at memory interfaces, bus interfaces, and/or compute block input/output (I/O) interfaces. If there is a fault in one or more of the compute engines, the fault will be reflected in a comparison mismatch. Systems in which more than one compute engine runs in lockstep for redundancy and every activity is compared at one or more interfaces are referred to herein as lockstep systems.

If a comparison circuit of a control system (e.g., a control system of a vehicle) develops a fault, then faults in the control system might go undetected, possibly resulting in an unreasonable risk. One technique used to avoid this possibility is to periodically halt the computing activity of the control system, save a context for the control system, perform a hardware diagnosis of the comparison circuit and the rest of the control system, and, if the hardware diagnosis doesn't detect any problems, restore the saved context and resume the activity of the control system. This technique imposes a serious limitation to software architecture of control systems and is frequently very difficult to do, as there is typically an idle-time duration constraint on the operations of the control system. That is, periods of time for the control system to be idle have a maximum allowed length, because the vehicle under the control of the control system cannot be uncontrolled for more than a very short period. This is a serious difficulty in designing a system that requires both safe operation and reliability. Furthermore, as systems are developed that have greater complexity, there are increasing risks of systematic and/or random hardware failures.

Therefore, techniques for improving the reliability of control systems using comparator circuits are desirable.

SUMMARY

Aspects disclosed herein relate to periodic non-intrusive diagnosis of lockstep systems.

In one aspect, a method for comparing execution of a plurality of processing systems of a device is provided. The method generally includes comparing execution of a program on a first processing system of the plurality of processing systems and execution of the program on a second processing system of the plurality of processing systems using a first comparator circuit, comparing the execution of the program on the first processing system and the execution of the program on the second processing system using a second comparator circuit, and running a diagnosis program on the second comparator circuit while the comparing using the first comparator circuit is ongoing.

In another aspect, an apparatus for comparing execution of a plurality of processing systems is provided. The apparatus generally includes a processor configured to compare execution of a program on a first processing system of the plurality of processing systems and execution of the program on a second processing system of the plurality of processing systems using a first comparator circuit, to compare the execution of the program on the first processing system and the execution of the program on the second processing system using a second comparator circuit, and to run a diagnosis program on the second comparator circuit while the comparing using the first comparator circuit is ongoing, and a memory coupled with the processor.

In still another aspect, an apparatus for comparing execution of a plurality of processing systems is provided. The apparatus generally includes means for comparing execution of a program on a first processing system of the plurality of processing systems and execution of the program on a second processing system of the plurality of processing systems using a first comparator circuit, means for comparing the execution of the program on the first processing system and the execution of the program on the second processing system using a second comparator circuit, and means for running a diagnosis program on the second comparator circuit while the comparing using the first comparator circuit is ongoing.

In still another aspect, a non-transitory computer-readable medium comprising instructions is provided. The instructions when executed by one or more processing systems cause the one or more processing systems to perform operations comprising comparing execution of a program on a first processing system of the plurality of processing systems and execution of the program on a second processing system of the plurality of processing systems using a first comparator circuit, comparing the execution of the program on the first processing system and the execution of the program on the second processing system using a second comparator circuit, and running a diagnosis program on the second comparator circuit while the comparing using the first comparator circuit is ongoing.

The claimed aspects may provide one or more advantages over previously known solutions. According to some aspects, diagnosis of components of a lockstep computing system may be performed despite taking longer than an idle time duration constraint of the lockstep computing system while also not allowing processing systems of the lockstep computing system to execute program steps without being verified.

BRIEF DESCRIPTION OF THE SEVERAL VIEWS OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only aspects of this disclosure and are therefore not to be considered limiting of its scope, for the disclosure may admit to other aspects.

DETAILED DESCRIPTION

Aspects disclosed herein provide techniques for periodic non-intrusive diagnosis of lockstep systems. According to aspects of the present disclosure, at least two comparator circuits sit between 2 compute engines (e.g., processors, processor cores) and compare the memory accesses (e.g., to tightly-coupled memory (TCM), level 1 (L1) data cache, level 2 (L2) data cache, L1 instruction cache, L2 instruction cache, system memory, system I/O interfaces) of the compute engines. If the compute engines are parts of a CPU, the comparator circuits may also compare program counters (PCs) of the compute engines. The two comparator circuits may operate in one of three modes. In a first mode, checks of the compute engines are enabled on both comparator circuits, and both comparator circuits are in use to diagnose if the compute engines are successfully in lockstep or not. In a second mode, the first comparator circuit is under self-diagnosis and the second comparator is in use to diagnose if the compute engines are successfully in lockstep or not. In a third mode, the second comparator circuit is under self-diagnosis and the first comparator circuit is in use to diagnose if the compute engines are successfully in lockstep or not.

Aspects of the present disclosure may have the following advantages over previously known techniques. First, software architecture limitations imposed to support diagnosis in current systems may be avoided, because non-intrusive diagnosis of comparator circuit(s) allows coverage of more of the operations included in the software architecture. As mentioned previously (see above), current techniques have difficulty achieving 100% coverage of operations while meeting idle-time duration constraints. With new more complex use cases, it may be increasingly infeasible to periodically diagnose control circuits using a single comparator circuit. Aspects of the present disclosure allow more time margin and hence better coverage of operations.

Figure 1:
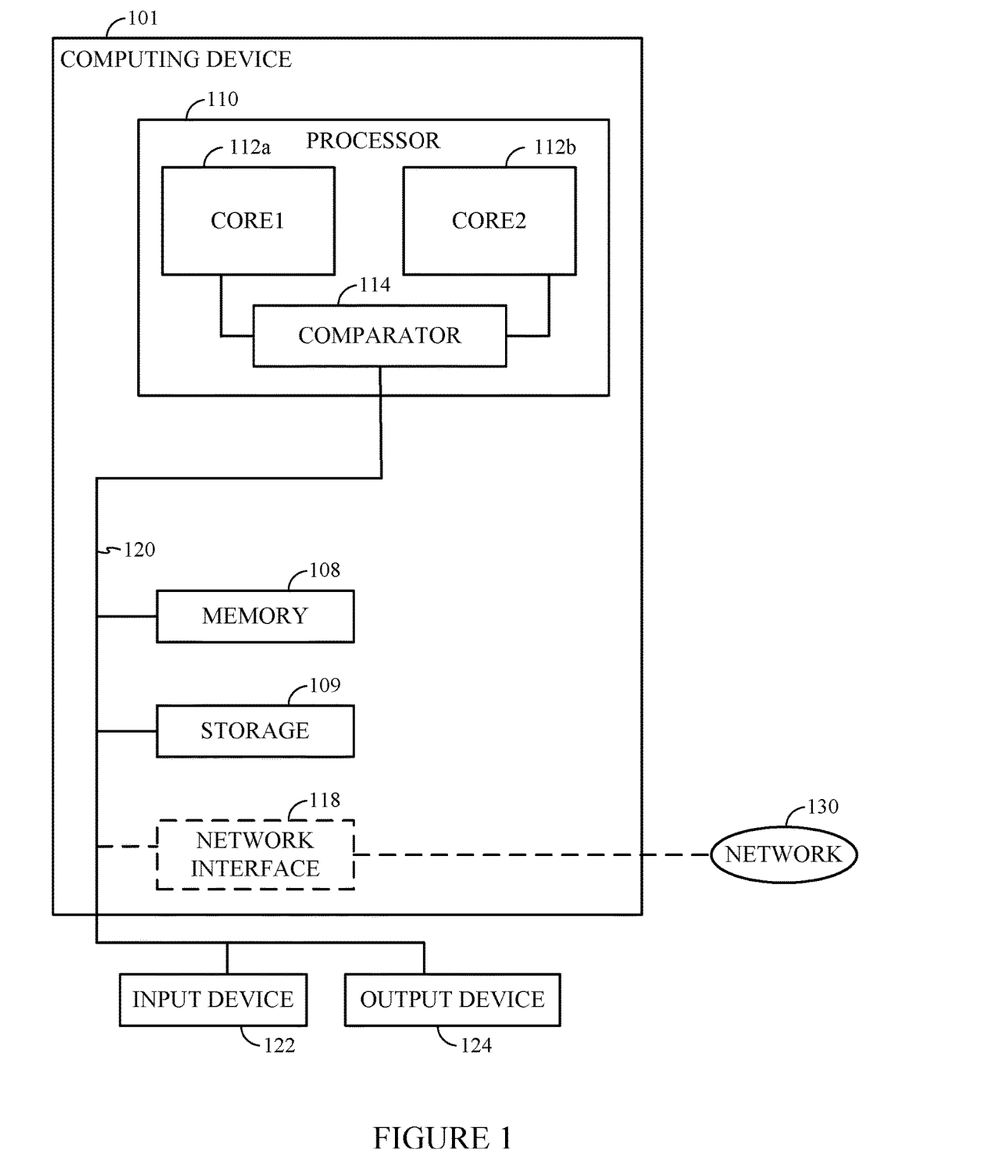
FIG. 1 is a functional block diagram of an exemplary computing device configured to operate according to aspects of the present disclosure.

FIG. 1 is a block diagram illustrating a computing device 101 configured to operate according to previously known techniques. The computing device 101 may be connected to other computing devices via a network 130. In general, the network 130 may be a telecommunications network and/or a wide area network (WAN). Generally, the computing device 101 may be any type of computing device configured to operate with cores in lockstep, including, without limitation, a desktop computer, a server, a laptop computer, a tablet computer, an ADAS, and a UAV control system.

The computing device 101 generally includes a processor 110 that includes two processing cores 112a, 112b, and a comparator circuit 114. The processing cores 112 are connected with the comparator circuit 114, which compares the activity of the processing cores 112. The comparator circuit 114 of the processor 110 is connected via a bus 120 to a memory 108, an optional network interface device 118, a storage 109, an input device 122, and an output device 124. The comparator circuit 114 compares the outputs of the processing cores 112 to ensure that the processing cores 112 are operating in lockstep. If a difference is detected in the outputs of the processing cores 112, then the comparator circuit 114 reports a fault for the processor. The computing device 101 generally operates according to an operating system (not shown). Any operating system supporting the functions disclosed herein may be used. The network interface device 118 may be any type of network communications device allowing the computing device 101 to communicate with other computing devices via the network 130.

The storage 109 may be a persistent storage device. Although the storage 109 is shown as a single unit, the storage 109 may be a combination of fixed and/or removable storage devices, such as fixed disc drives, solid state drives, SAN storage, NAS storage, removable memory cards or optical storage. The memory 108 and the storage 109 may be part of one virtual address space spanning multiple primary and secondary storage devices.

The input device 122 may be any device operable to enable a user to provide input to the computing device 101, including an input device operable by a user and/or one or more sensors. For example, the input device 122 may be an optical sensor. The output device 124 may be any device operable to provide output to a user of the computing device 101 and/or to a system under the control of the computing device. For example, the output device 124 may be an automobile or a UAV. Although shown separately from the input device 122, the output device 124 and input device 122 may be combined. For example, a display screen with an integrated touch-screen may be a combined input device 122 and output device 124.

The operation of the comparator may be represented with a fault detection table as shown below.

| Input to Comparator Circuit 114 from Core1 | Input to Comparator Circuit 114 from Core2 | Output from Comparator Circuit 114 |
|---|---|---|
| 0 | 0 | 0 (no fault detected) |
| 0 | 1 | 1 (fault detected) |
| 1 | 0 | 1 (fault detected) |
| 1 | 1 | 0 (no fault detected) |

As shown in the fault detection table, if the outputs from the cores 112 of the processor 110 are different, then the comparator circuit 114 reports a fault, which may cause the computing device (e.g. a control system) to stop operating.

Figure 2A:
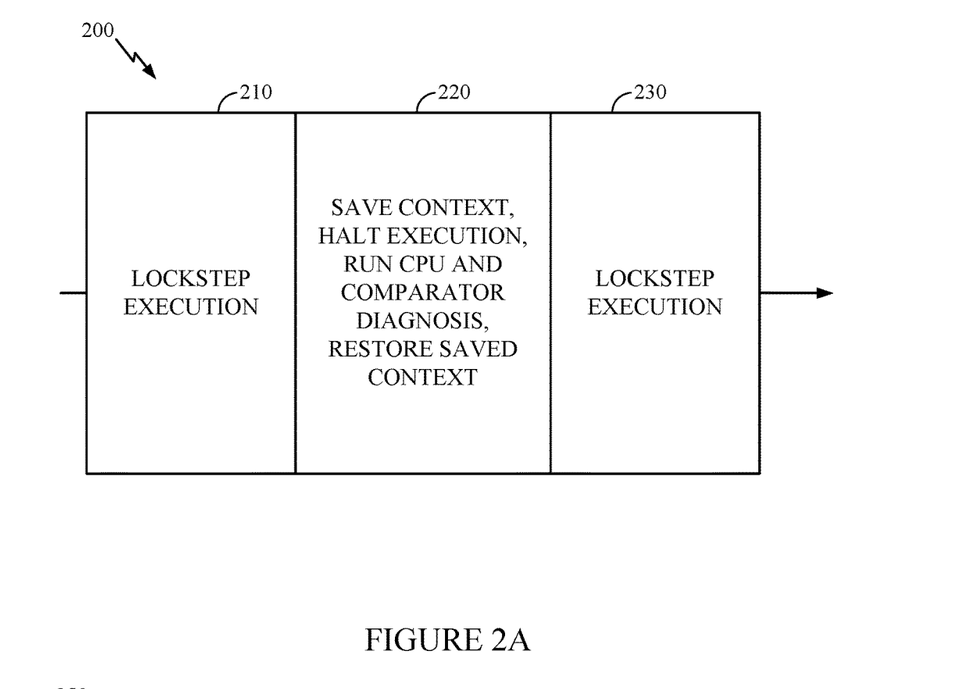
FIGS. 2A and 2B illustrate exemplary timelines of techniques for checking operation of a lockstep computing system, according to aspects of the present disclosure.
Figure 2B:
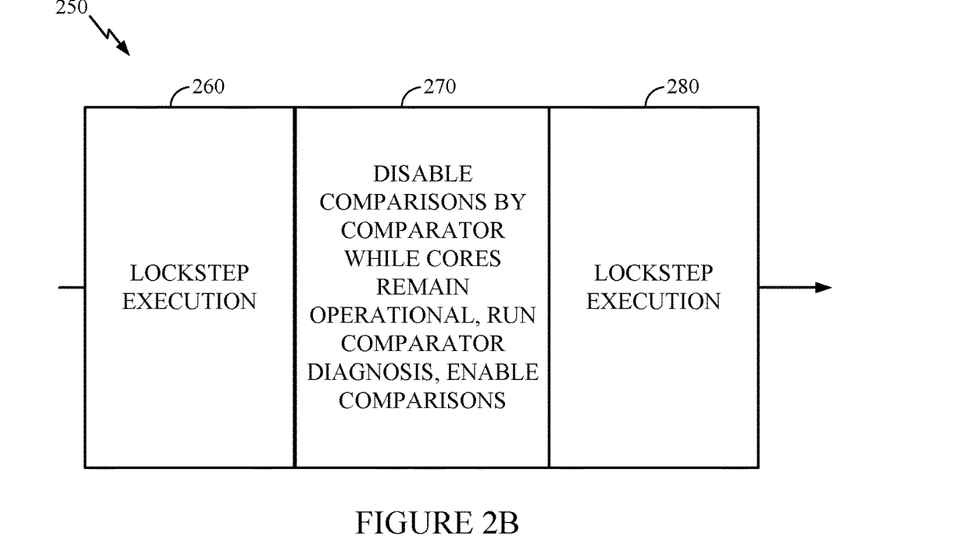

FIGS. 2A and 2B illustrate exemplary timelines 200 and 250 of techniques for checking operation of a lockstep computing system (e.g., computing device 101 shown in FIG. 1), according to previously known techniques.

In the timeline 200 shown in FIG. 2A, the lockstep computing system is operating in lockstep at 210. At 220, the system performs a self-diagnosis. The self-diagnosis includes operations to save a current context for the lockstep computing device, run a CPU and comparator diagnosis program, and, if no faults are found, restore the saved context. At 230, the lockstep computing system returns to lockstep execution. As mentioned previously, the time used for the operations at 220 must be less than or equal to an idle time duration constraint for the lockstep computing system.

In the timeline 250 shown in FIG. 2B, the lockstep computing system is operating in lockstep at 260. At 270, the system performs a self-diagnosis. The self-diagnosis includes operations to disable comparisons by the comparator while the cores remain operational, run a comparator diagnosis program, and, if no faults are found, enable comparisons by the comparator. At 280, the lockstep computing system returns to lockstep execution. This technique does not have the difficulty of ensuring that the self-diagnosis operation must be less than or equal to an idle time duration constraint for the lockstep computing system (see above), however, while the self-diagnosis of the comparator is being run at 270, the comparator is not checking the operations of the cores at 270, possibly allowing a fault in one of the cores to go undetected. In some systems using this technique, coverage of the self-diagnosis program for the comparator is limited in order to limit the time required by the self-diagnosis program, during which time operation of the cores is not being checked.

Figure 3:
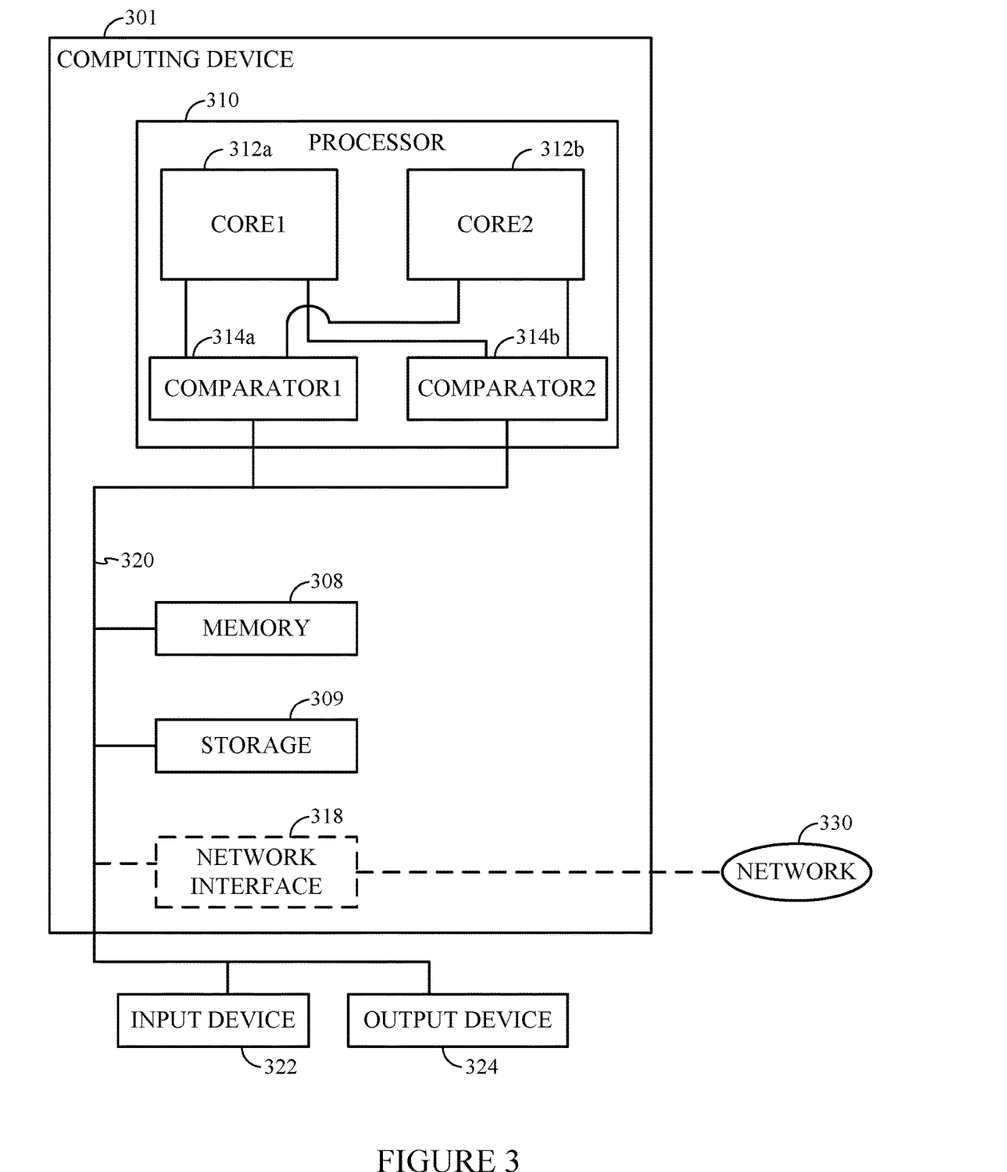
FIG. 3 is a block diagram illustrating a computing device configured to operate according to aspects of the present disclosure.

FIG. 3 is a block diagram illustrating a computing device 301 configured to operate according to aspects of the present disclosure. The computing device 301 may be connected to other computing devices via a network 330. In general, the network 330 may be a telecommunications network and/or a wide area network (WAN). Generally, the computing device 301 may be any type of computing device configured to operate with cores in lockstep according to aspects of the present disclosure, including, without limitation, a desktop computer, a server, a laptop computer, a tablet computer, an ADAS, and a UAV control system.

The computing device 301 generally includes a processor 310 that includes two processing cores 312a, 312b, and two comparator circuits 314a, 314b. The processing cores 312 are connected with the comparator circuits 314, each of which may compare the activity of the processing cores 312. Similar to the computing device 101 in FIG. 1, the comparator circuits 314 are connected via a bus 320 to a memory 308, an optional network interface device 318, a storage 309, an input device 322, and an output device 324. The comparator circuits 314 may compare the outputs of the processing cores 312 to ensure that the processing cores 312 are operating in lockstep. The comparator circuits may compare the outputs of the processing cores at various points, including memory interfaces, bus interfaces, and compute block I/O interfaces. The computing device 301 generally operates according to an operating system (not shown). As above, any operating system supporting the functions disclosed herein may be used. The network interface device 318 may be any type of network communications device allowing the computing device 301 to communicate with other computing devices via the network 330.

The storage 309 may be a persistent storage device. As above, although the storage 309 is shown as a single unit, the storage 309 may be a combination of fixed and/or removable storage devices, such as fixed disc drives, solid state drives, SAN storage, NAS storage, removable memory cards, or optical storage. The memory 238 and the storage 309 may be part of one virtual address space spanning multiple primary and secondary storage devices.

The input device 322 may be any device operable to provide input to the computing device 301, including an input device operable by a user and/or one or more sensors. For example, the input device 322 may be an optical sensor. The output device 324 may be any device operable to provide output to a user of the computing device 301 and/or to a system under the control of the computing device. For example, the output device 324 may be an automobile or a UAV. Although shown separately from the input device 322, the output device 324 and input device 322 may be combined. For example, a display screen with an integrated touch-screen may be a combined input device 322 and output device 324.

While the computing device 301 is shown with a single processor with multiple cores, the disclosure is not so limited, and aspects of the present disclosure may be practiced in a computing device with a plurality of single-core processors and/or in a computing device with a plurality of multi-core processors. As used herein, "comparator circuit" may refer to one or more components of a processor useful for comparing operations of cores of the processor, one or more components of a computing device separate from a processor and useful for comparing operations of cores of the processor, one or more components of a computing device useful for comparing operations of a plurality of processors (e.g., in a multi-processor computing device), or one or more processors useful for comparing operations of a plurality of other processors.

Figure 4:
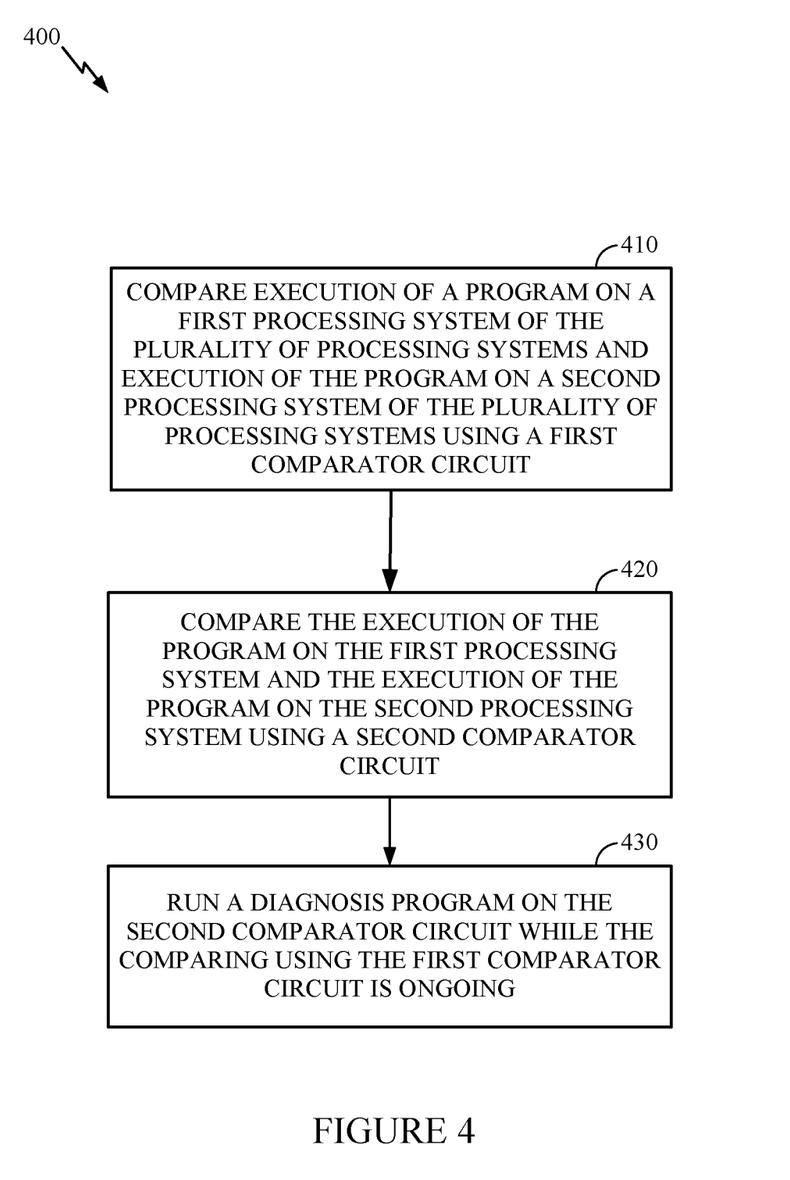
FIG. 4 illustrates operations that may be performed by one or more processing systems of a computing device, according to aspects of the present disclosure.

FIG. 4 is a flow chart illustrating a method 400 for comparing execution of a plurality of processing systems that may be performed by one or more processing systems of a computing device, such as computing device 301 shown in FIG. 3, according to aspects of the present disclosure. As used herein, "processing system" may refer to a processing core of a processor, to a processor, or to a set of components (e.g., processor 310, bus 320, memory 308, and storage 309 shown in FIG. 3) for performing computer processing. In at least one aspect, the processor 310 is used in performing the steps of the method 400. The method 400 depicts an aspect where the computing device compares execution of a program on a first processing system with execution of a program on a second processing system using a first comparator circuit and a second comparator circuit, then stops the comparing using the second comparator circuit and runs a diagnosis program on the second comparator circuit while continuing the comparing using the first comparator circuit, as mentioned above and described in more detail below.

At block 410, the method begins by the computing device (e.g., computing device 301) comparing execution of a program on a first processing system of the plurality of processing systems and execution of the program on a second processing system of the plurality of processing systems using a first comparator circuit. For example, the processor 310 of the computing device 301 compares execution of a program on processor core 312a to execution of the program on processor core 312b using comparator 314a.

At block 420, the method continues by the computing device comparing the execution of the program on the first processing system and the execution of the program on the second processing system using a second comparator circuit. Continuing the example above, the processor 310 of the computing device 301 compares execution of the program on processor core 312a to execution of the program on processor core 312b using comparator 314b.

At block 430, the method continues by the computing device running a diagnosis program on the second comparator circuit while the comparing using the first comparator circuit is ongoing. Continuing the example above, the processor 310 of the computing device 301 runs a self-diagnosis program on the comparator 314b while comparing execution of the program on processor core 312a to execution of the program on processor core 312b using comparator 314a.

According to aspects of the present disclosure, a comparator circuit may be disabled from comparing execution of a program on processing systems before a diagnosis program is run on the comparator circuit. After the diagnosis program completes running, the comparator circuit is enabled to compare execution of the program on the processing systems.

Figure 5:
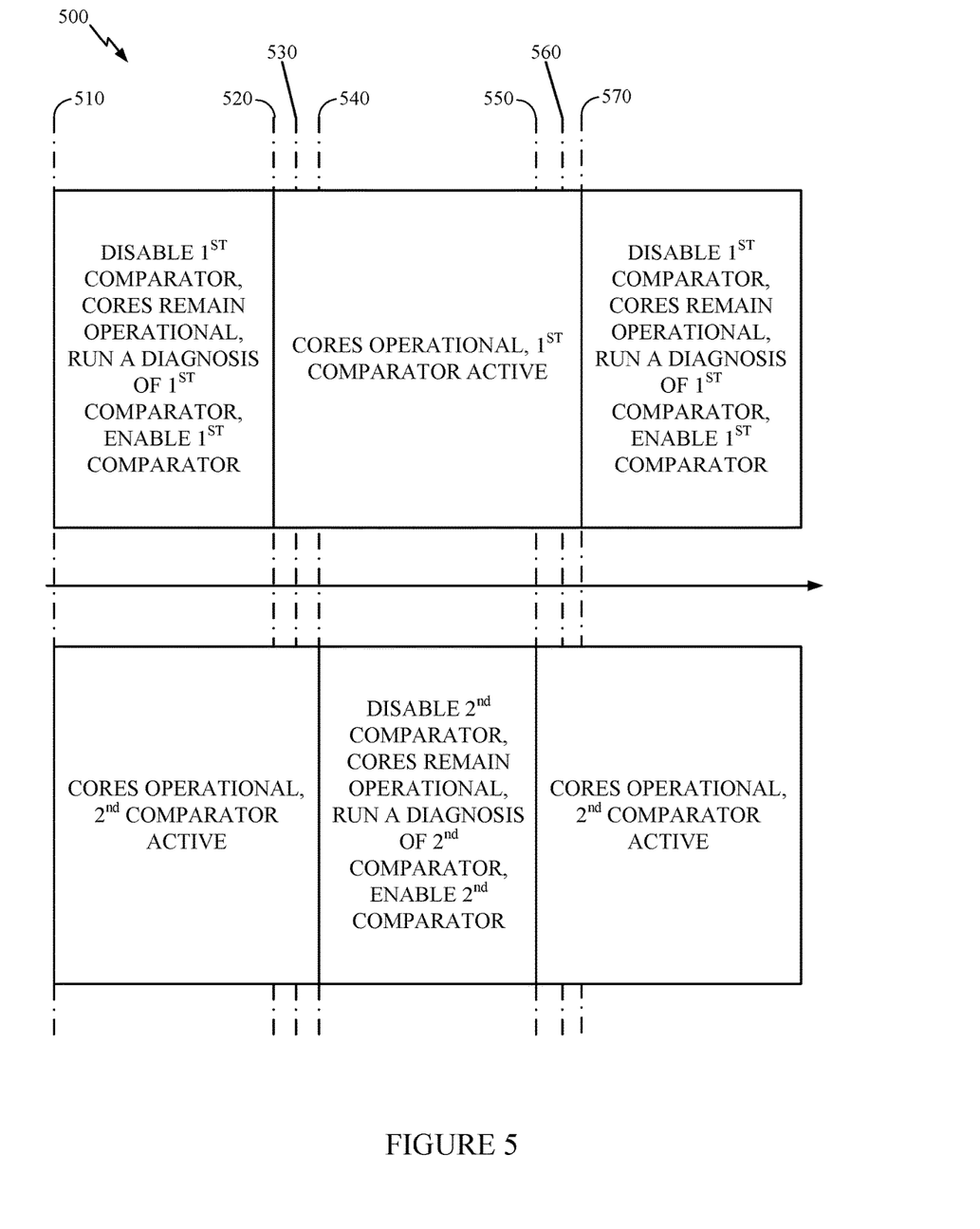
FIG. 5 illustrates an exemplary timeline of operations, according to aspects of the present disclosure.

FIG. 5 illustrates an exemplary timeline 500 showing operations for comparing execution of a plurality of processing systems of a lockstep computing system (e.g., computing device 301 shown in FIG. 3), according to of the present disclosure. In the timeline 500, processing cores of a processor of a lockstep computing system are operating in lockstep. At 510, the computing device disables a first comparator while the cores remain operating in lockstep and a second comparator is active and verifying that the cores are in lockstep, with no faults detected. At 520, the diagnosis of the first comparator is complete and the computing device enables the first comparator. At 530, both of the first and the second comparator are active, checking that the processing cores are operating in lockstep with no faults. At 540, the computing device disables the second comparator while the cores remain operating in lockstep and the first comparator is active and verifying that the cores are in lockstep, with no faults detected. At 550, the diagnosis of the second comparator is complete and the computing device enables the second comparator. At 560, both of the first and the second comparator are active, checking that the processing cores are operating in lockstep with no faults. At 570, the computing device disables the first comparator while the cores remain operating in lockstep and the second comparator is active and verifying that the cores are in lockstep, with no faults detected. The operations at 570 may be a duplicate of the operations at 510, with the computing device continuing to operate in a continuing cycle of disabling and checking each comparator in turn while the other comparator and the processing cores remain active.

The timeline 500 illustrates some advantages that an embodiment of the present disclosure may have over computing systems using previously known techniques. One advantage may be that, because the processing systems (e.g., cores) are not idle while a diagnosis program is run on a comparator, the diagnosis program is not required to complete operation in less time than an idle time duration constraint of the lockstep computing system, unlike the technique associated with the timeline shown in FIG. 2A. Another advantage may be that there are no times that the processing systems (e.g., cores) of the computing device are not being verified by at least one comparator, unlike the technique associated with the timeline shown in FIG. 2B.

According to aspects of the present disclosure, a computing device may have a fail-operational capability. That is, even after a failure has been found in a comparator circuit, the computing device may continue to safely operate with the cores operating in lockstep and the operations of the cores being verified by another comparator circuit that did not suffer a failure. The table below illustrates various operational modes that a computing device may have, based on the status of comparators of the computing device.

| 1st Comparator status | 2nd Comparator status | Computing device operational mode |
|---|---|---|
| ON | ON | SAFE |
| ON | DIAGNOSIS | SAFE |
| DIAGNOSIS | ON | SAFE |
| ON | FAILED | FAIL-OPERATIONAL |
| FAILED | ON | FAIL-OPERATIONAL |

According to aspects of the present disclosure, a system (e.g., an automobile, a UAV) using a computing device having a fail-operational mode may allow the system to operate safely after detecting a failure in comparator logic. Continued operation in the fail-operational mode may allow time for replacement of a failed component and/or time to reach a service center, where the system may be repaired.

Figure 6:
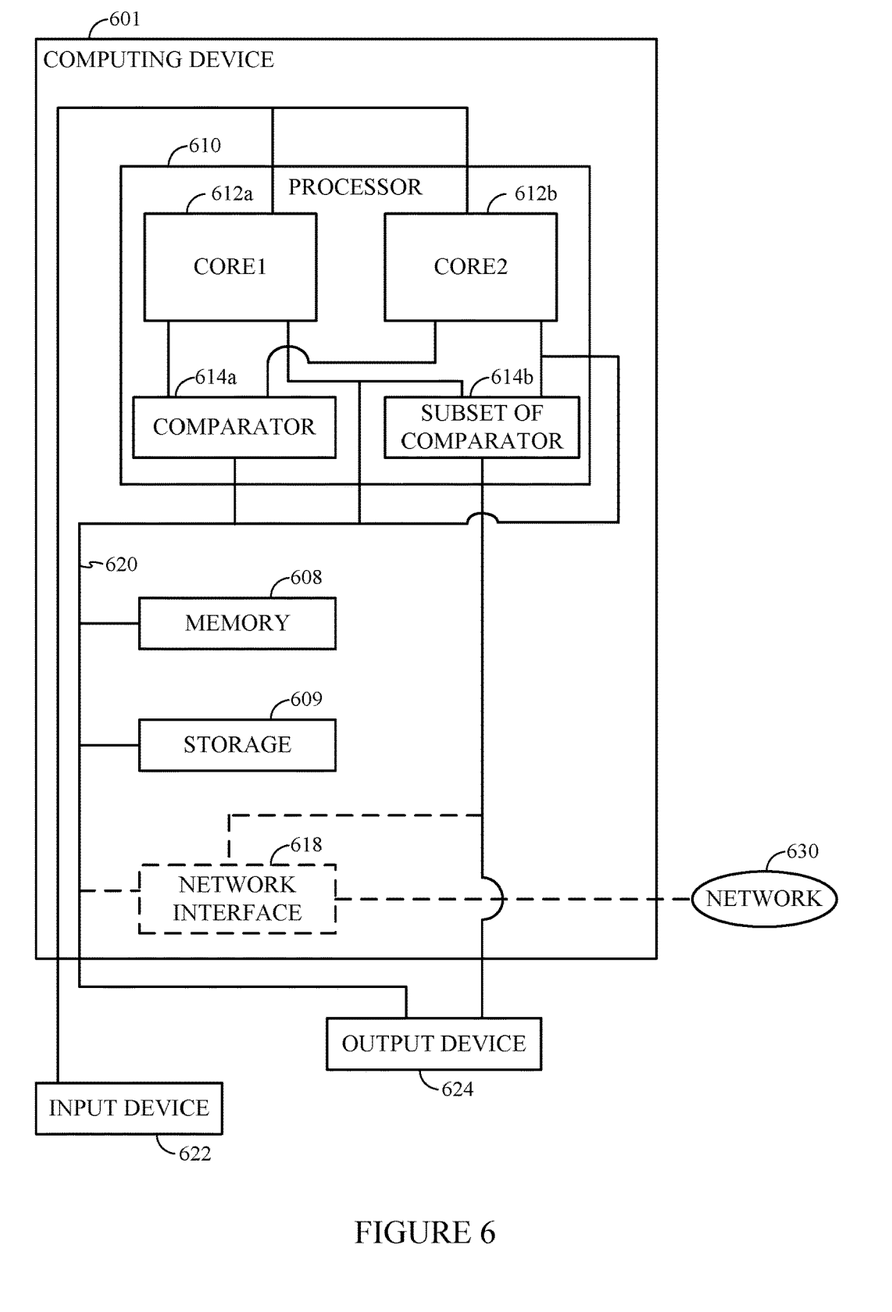
FIG. 6 is a block diagram illustrating a computing device configured to operate according to aspects of the present disclosure.

FIG. 6 is a block diagram illustrating a computing device 601 configured to operate according to aspects of the present disclosure. The computing device 601 may be connected to other computing devices via a network 630. In general, the network 630 may be a telecommunications network and/or a wide area network (WAN). Generally, the computing device 601 may be any type of computing device configured to operate with cores in lockstep according to aspects of the present disclosure, including, without limitation, a desktop computer, a server, a laptop computer, a tablet computer, an ADAS, and a UAV control system.

The computing device 601 generally includes a processor 610 that includes two processing cores 612a, 612b, and two comparator circuits 614a, 614b. The processing cores 612 are connected with the comparator circuits 614, each of which may compare the activity of the processing cores 612. According to aspects of the present disclosure, a second comparator circuit 614b of computing device 601 may duplicate a subset of functionality of a first comparator circuit 614a, while not duplicating all of the functionality of the first comparator circuit. The second comparator circuit may verify outputs of processing cores 612a and 612b that affect outputs of the computing device to a controlled system (e.g., an automobile, a UAV) while not verifying accesses to memory (e.g., L1 cache, L2 cache) and other components. Such a computing device may be referred to as having "smart" redundancy. For example, a computing device may be configured such that all outputs to a controlled system traverse an advanced extensible interface (AXI) bus and/or an accelerator coherency port (ACP) bus. In the example, the computing device may have a first comparator circuit that verifies all outputs of the processing systems and a second comparator circuit that verifies outputs from the processing systems on the AXI and ACP buses, but not other outputs from the processing systems.

Similar to the computing device 101 in FIG. 1, the comparator circuits 614 are connected via a bus 620 to a memory 608, an optional network interface device 618, a storage 609, an input device 622, and an output device 624. The comparator circuit 614a may compare the outputs of the processing cores 612 to ensure that the processing cores 612 are operating in lockstep. The comparator circuit 614b may compare outputs of the processing cores to the controlled system. The computing device 601 generally operates according to an operating system (not shown). As above, any operating system supporting the functions disclosed herein may be used. The network interface device 618 may be any type of network communications device allowing the computing device 601 to communicate with other computing devices via the network 630.

While the computing device 601 is shown with a single processor with multiple cores, the disclosure is not so limited, and aspects of the present disclosure may be practiced in a computing device with a plurality of single-core processors and/or in a computing device with a plurality of multi-core processors. As used herein, "comparator circuit" may refer to one or more components of a processor useful for comparing operations of cores of the processor, one or more components of a computing device separate from a processor and useful for comparing operations of cores of the processor, one or more components of a computing device useful for comparing operations of a plurality of processors (e.g., in a multi-processor computing device), or one or more processors useful for comparing operations of a plurality of other processors.

According to aspects of the present disclosure, a computing device having a first comparator circuit and a second comparator circuit that duplicates a subset of functionality of the first comparator circuit may have a fail-operational capability, as previously described. That is, even after a failure has been found in the second comparator circuit, the computing device may continue to safely operate with the cores operating in lockstep and the operations of the cores being verified by the first comparator circuit, similar to above. And, even after a failure has been found in the first comparator circuit, the computing device may continue to safely operate with the outputs to the controlled system (e.g., an automobile) being verified by the second comparator circuit.

According to aspects of the present disclosure, a computing device having a first comparator circuit and a second comparator circuit that duplicates a subset of functionality of the first comparator circuit may have lower complexity and/or cost less than a computing device having first and second comparator circuits that are duplicates of each other.

According to aspects of the present disclosure, a computing device having a first comparator circuit and a second comparator circuit may enable routine checking of components (e.g., comparator circuits) of a lockstep computing system without requiring a time period of inactivity for the computing device. For example, as illustrated in FIG. 5, a first comparator circuit of a computing device may be checked by a diagnosis program while the computing system remains active and a second comparator verifies that processing systems of the computing system are operating in lockstep.

A number of aspects have been described. However, various modifications to these aspects are possible, and the principles presented herein may be applied to other aspects as well. The various tasks of such methods may be implemented as sets of instructions executable by one or more arrays of logic elements, such as microprocessors, embedded controllers, or IP cores.

The foregoing disclosed devices and functionalities may be designed and configured into computer files (e.g. RTL, GDSII, GERBER, etc.) stored on computer readable media. Some or all such files may be provided to fabrication handlers who fabricate devices based on such files. Resulting products include semiconductor wafers that are then cut into semiconductor die and packaged into a semiconductor chip. Some or all such files may be provided to fabrication handlers who configure fabrication equipment using the design data to fabricate the devices described herein. Resulting products formed from the computer files include semiconductor wafers that are then cut into semiconductor die (e.g., the processor 101) and packaged, and may be further integrated into products including, but not limited to, mobile phones, smart phones, laptops, netbooks, tablets, ultrabooks, desktop computers, digital video recorders, set-top boxes, servers, and any other devices where integrated circuits are used.

In one aspect, the computer files form a design structure including the circuits described above and shown in the Figures in the form of physical design layouts, schematics, a hardware-description language (e.g., Verilog, VHDL, etc.). For example, design structure may be a text file or a graphical representation of a circuit as described above and shown in the Figures. Design process preferably synthesizes (or translates) the circuits described below into a netlist, where the netlist is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. In another embodiment, the hardware, circuitry, and method described herein may be configured into computer files that simulate the function of the circuits described above and shown in the Figures when executed by a processor. These computer files may be used in circuitry simulation tools, schematic editors, or other software applications.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method for comparing execution of a plurality of processing systems of a device, comprising:
   comparing execution of a program on a first processing system of the plurality of processing systems and execution of the program on a second processing system of the plurality of processing systems using a first comparator circuit;
   comparing the execution of the program on the first processing system and the execution of the program on the second processing system using a second comparator circuit; and
   running a diagnosis program, configured to diagnose a failure of the second comparator circuit, on the second comparator circuit while the comparing using the first comparator circuit is ongoing.

2. The method of claim 1, further comprising:
   running the diagnosis program or another diagnosis program on the first comparator circuit while the comparing using the second comparator circuit is ongoing.

3. The method of claim 1, further comprising:
   disabling the second comparator circuit prior to running the diagnosis program; and
   enabling the second comparator circuit subsequent to running the diagnosis program.

4. The method of claim 1, wherein comparing the execution of the program on the first processing system and the execution of the program on the second processing system comprises comparing first outputs written to a memory by the first processing system with second outputs written to the memory by the second processing system.

5. The method of claim 1, wherein comparing the execution of the program on the first processing system and the execution of the program on the second processing system comprises comparing first outputs transmitted via one or more buses by the first processing system with second outputs transmitted via one or more buses by the second processing system.

6. The method of claim 5, wherein the one or more buses comprise at least one of an advanced extensible interface (AXI) bus or an accelerator coherency port (ACP) bus.

7. The method of claim 1, wherein:
comparing the execution of the program on the first processing system and the execution of the program on the second processing system using the first comparator circuit comprises comparing first outputs of the first processing system with second outputs of the second processing system; and
comparing the execution of the program on the first processing system and the execution of the program on the second processing system using the second comparator circuit comprises comparing third outputs, of the first processing system, that are different from the first outputs with fourth outputs, of the second processing system, that are different from the second outputs.

8. The method of claim 1, wherein:
the first processing system comprises a first core of a multi-core processor; and
the second processing system comprises a second core of the multi-core processor.

9. The method of claim 1, wherein:
the first processing system comprises a first processor of the device; and
the second processing system comprises a second processor of the device.

10. The method of claim 1, wherein the diagnosis program detects a fault in the second comparator circuit, and the method further comprises:
outputting an indication that the device has the fault and is operating safely.

11. The method of claim 1, wherein:
comparing the execution of the program on the first processing system and the execution of the program on the second processing system using the first comparator circuit comprises comparing outputs, from the first processing system and the second processing system, that control another device; and
comparing the execution of the program on the first processing system and the execution of the program on the second processing system using the second comparator circuit comprises:
comparing the outputs, from the first processing system and the second processing system, that control the other device, and
comparing other outputs from the first processing system with corresponding other outputs from the second processing system.

12. An apparatus, comprising:
a first processing system;
a second processing system;
a first comparator circuit operable to compare execution of a program on the first processing system and execution of the program on the second processing system; and
a second comparator circuit operable to compare the execution of a program on the first processing system and the execution of the program on the second processing system and to run a diagnosis program, configured to diagnose a failure of the second comparator circuit, while the first comparator circuit is comparing the execution of the program on the first processing system and the execution of the program on the second processing system.

13. The apparatus of claim 12, wherein the first comparator circuit is operable to run the diagnosis program or another diagnosis program while the second comparator circuit is comparing the execution of the program on the first processing system and the execution of the program on the second processing system.

14. The apparatus of claim 12, wherein the second comparator circuit is operable to be disabled prior to running the diagnosis program and operable to be enabled subsequent to running the diagnosis program.

15. The apparatus of claim 12, wherein:
the first comparator circuit is configured to compare the execution of the program on the first processing system and the execution of the program on the second processing system by comparing first outputs written to a memory by the first processing system with second outputs written to the memory by the second processing system; and
the second comparator circuit is configured to compare the execution of the program on the first processing system and the execution of the program on the second processing system by comparing the first outputs with the second outputs.

16. The apparatus of claim 12, wherein:
the first comparator circuit is configured to compare the execution of the program on the first processing system and the execution of the program on the second processing system by comparing first outputs transmitted via one or more buses by the first processing system with second outputs transmitted via one or more buses by the second processing system; and
the second comparator circuit is configured to compare the execution of the program on the first processing system and the execution of the program on the second processing system by comparing the first outputs with the second outputs.

17. The apparatus of claim 16, wherein the one or more buses comprise at least one of an advanced extensible interface (AXI) bus or an accelerator coherency port (ACP) bus.

18. The apparatus of claim 12, wherein:
the first comparator circuit is configured to compare the execution of the program on the first processing system and the execution of the program on the second processing system by comparing first outputs of the first processing system with second outputs of the second processing system; and
the second comparator circuit is configured to compare the execution of the program on the first processing system and the execution of the program on the second processing system by comparing third outputs, of the first processing system, that are different from the first outputs and fourth outputs, of the second processing system, that are different from the second outputs.

19. The apparatus of claim 12, wherein:
the first processing system comprises a first core of a multi-core processor; and
the second processing system comprises a second core of the multi-core processor.

20. The apparatus of claim 12, wherein:
the first processing system comprises a first processor of the apparatus; and
the second processing system comprises a second processor of the apparatus.

21. The apparatus of claim 12, wherein:
at least one of the first processing system, the second processing system, the first comparator circuit, and the second comparator circuit is operable to detect a fault in the second comparator circuit based on the second comparator circuit running the diagnosis program; and
at least one of the first processing system and the second processing system is operable to output an indication that the apparatus has the fault and is operating safely.

22. The apparatus of claim 12, wherein:
the first comparator circuit is operable to compare the execution of the program on the first processing system and the execution of the program on the second processing system by comparing outputs, from the first processing system and the second processing system, that control a device; and
the second comparator circuit is operable to compare the execution of the program on the first processing system and the execution of the program on the second processing system by:
comparing the outputs, from the first processing system and the second processing system, that control the device, and
comparing other outputs from the first processing system with corresponding other outputs from the second processing system.

23. An apparatus, comprising:
first means for processing;
second means for processing;
first means for comparing execution of a program on the first means for processing and execution of the program on a second means for processing;
second means for comparing the execution of the program on the first means for processing and the execution of the program on the second means for processing; and
means for running a diagnosis program, configured to diagnose a failure of the second means for comparing, on the second means for comparing while the first means for comparing is comparing the execution of the program on the first means for processing and the execution of the program on the second means for processing.

24. The apparatus of claim 23, further comprising:
means for running the diagnosis program or another diagnosis program on the first means for comparing while the second means for comparing is comparing the execution of the program on the first means for processing and the execution of the program on the second means for processing.

25. The apparatus of claim 23, further comprising:
means for disabling the second means for comparing prior to running the diagnosis program; and
means for enabling the second means for comparing subsequent to running the diagnosis program.

26. The apparatus of claim 23, wherein:
the first means for comparing comprises means for comparing first outputs written to a memory by the first means for processing with second outputs written to the memory by the second means for processing; and
the second means for comparing comprises means for comparing the first outputs with the second outputs.

27. The apparatus of claim 23, wherein:
the first means for comparing comprises means for comparing first outputs transmitted via one or more buses by the first means for processing with second outputs transmitted via one or more buses by the second means for processing; and
the second means for comparing comprises means for comparing the first outputs with the second outputs.

28. The apparatus of claim 27, wherein the one or more buses comprise at least one of an advanced extensible interface (AXI) bus or an accelerator coherency port (ACP) bus.

29. The apparatus of claim 23, wherein:
the first means for comparing comprises means for comparing first outputs of the first means for processing with second outputs of the second means for processing; and
the second means for comprises means for comparing third outputs, of the first processing system, that are different from the first outputs with fourth outputs, of the second processing system, that are different from the second value outputs.

30. The apparatus of claim 23, wherein:
the first means for processing comprises a first core of a multi-core processor; and
the second means for processing comprises a second core of the multi-core processor.

31. The apparatus of claim 23, wherein:
the first means for processing comprises a first processor of the apparatus; and
the second means for processing comprises a second processor of the apparatus.

32. The apparatus of claim 23, wherein:
at least one of the first means for processing, the second means for processing, the first means for comparing, and the second means for comparing comprises means for detecting a fault in the second means for comparing based on the second means for comparing running the diagnosis program; and
at least one of the first means for processing and the second means for processing comprises means for outputting an indication that the apparatus has the fault and is operating safely.

33. The apparatus of claim 23, wherein:
the first means for comparing comprises means for comparing outputs, from the first means for processing and the second means for processing, that control another device; and
the second means for comparing comprises:
means for comparing the outputs, from the first means for processing and the second means for processing, that control the other device, and
means for comparing other outputs from the first means for processing with corresponding other outputs from the second means for processing.

34. A non-transitory computer-readable medium comprising instructions, the instructions when executed by one or more processing systems cause the one or more processing systems to perform operations comprising:
comparing execution of a program on a first processing system of the plurality of processing systems and execution of the program on a second processing system of the plurality of processing systems using a first comparator circuit;

comparing the execution of the program on the first processing system and the execution of the program on the second processing system using a second comparator circuit; and running a diagnosis program, configured to diagnose a failure of the second comparator circuit, on the second comparator circuit while the comparing using the first comparator circuit is ongoing.

* * * * *